United States Patent [19]
Wolfram

[11] Patent Number: 5,862,196
[45] Date of Patent: *Jan. 19, 1999

[54] FUEL ASSEMBLY AND SPACER FOR A NUCLEAR REACTOR

[75] Inventor: Dietmar Wolfram, Eskilstuna, Sweden

[73] Assignee: ABB Atom AB, Västerås, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 860,015
[22] PCT Filed: Nov. 7, 1995
[86] PCT No.: PCT/SE95/01472
   § 371 Date: Jun. 20, 1997
   § 102(e) Date: Jun. 20, 1997
[87] PCT Pub. No.: WO96/19811
   PCT Pub. Date: Jun. 27, 1996

[30] Foreign Application Priority Data

Dec. 21, 1994 [SE] Sweden .................................. 9404433

[51] Int. Cl.⁶ .................................................. G21C 3/322
[52] U.S. Cl. .............................................................. 376/439
[58] Field of Search ...................................... 376/439, 443

[56] References Cited

U.S. PATENT DOCUMENTS

| | | | |
|---|---|---|---|
| 4,252,613 | 2/1981 | Jabsen | 376/439 |
| 4,313,797 | 2/1982 | Attix | 376/439 |
| 5,112,571 | 5/1992 | Orii et al. | 376/439 |

FOREIGN PATENT DOCUMENTS

| | | |
|---|---|---|
| 0 007 688 | 2/1980 | European Pat. Off. |
| 0 026 029 | 4/1981 | European Pat. Off. |
| 35 19 421 | 12/1993 | Germany |
| WO 94/20962 | 9/1994 | WIPO |

*Primary Examiner*—Daniel D. Wasil
*Attorney, Agent, or Firm*—Pollock, Vande Sande & Amernick

[57] ABSTRACT

A spacer including a plurality of cells to retain and mutually fix parallel, elongated elements, extending through the cells, in a bundle in a fuel assembly for a nuclear reactor where a coolant is adapted to flow from below and upwards. Between the cells, secondary channels are formed. At least one of the spacers includes at least two deflection members being substantially arranged so as to be surrounded by the cells. The deflection members are axially spaced-apart in the direction of flow of the coolant and relative to each other at a pitch angle for stepwise axial and radial deflection and guiding of at least part of the coolant flow towards fuel rods included in the bundle. The fuel rods are arranged close to the secondary channels.

16 Claims, 9 Drawing Sheets

FUEL ASSEMBLY AND SPACER FOR A NUCLEAR REACTOR

FIELD OF THE INVENTION

The present invention relates to a fuel assembly and a spacer for a light-water nuclear reactor. More particularly, the reactor is a boiling water reactor or a pressurized-water reactor. The fuel assembly comprises a bundle of elongated fuel rods retained and fixed by a number of spacers arranged in spaced relationship to each other along the bundle. The spacers comprise a number of cells for mutually fixing the fuel rods. A coolant, for example water, is adapted to flow from below and up through the normally vertically arranged fuel assembly and, during a nuclear reaction, to cool the fuel rods arranged in the assembly.

BACKGROUND OF THE INVENTION

A fuel assembly in a boiling water nuclear reactor consists of an elongated tubular container, often with a rectangular or square cross section. The container is open at both ends forming a continuous flow passage. The coolant of the reactor is able to flow through the passage. The fuel assembly comprises a large number of equally elongated tubular fuel rods, arranged in parallel in a certain definite, normally symmetrical pattern. At the top, the fuel rods are retained by a top tie plate and at the bottom by a bottom tie plate. To allow coolant in the desired manner to flow past the fuel rods, it is important to keep them at a distance from each other and prevent them from bending or vibrating when the reactor is in operation. For this purpose, a plurality of spacers are used, distributed along the fuel assembly in the longitudinal direction.

A fuel assembly for a pressurized-water nuclear reactor has, in principle, the same design as a fuel assembly for a boiling water nuclear reactor, apart from the fact that the fuel rods are not enclosed by any tubular container and the fact that their number is higher.

Between the fuel rods secondary channels are formed, through which the coolant flows through the fuel assembly.

An important factor when designing a spacer for a light-water reactor is to ensure that the spacer brings about a good cooling of the fuel rods by a suitable mixing of the coolant. In those cases where the cooling is not sufficient, so-called dryout may occur in a boiling water reactor. A so-called DNB (Departure from Nucleate Boiling) may occur in a pressurized-water reactor. In serious cases, dryout and DNB, respectively, give rise to penetration of the fuel rods.

The spacers thus influence the flow of the coolant and hence the cooling of the fuel. It is known that, in a region immediately below the spacer where the coolant has still not passed through the spacer, a deterioration of the coolant film on the fuel rods occurs. On the other hand, in a region above the spacer, where the coolant has just passed through the spacer, a reinforcement of the water film instead occurs. The reinforcement of the coolant film is due to the turbulence which arises in the coolant when it passes through a spacer. The greatest risk of dryout exists in the upper part of the fuel immediately below the spacers.

One way of increasing the cooling of fuel rods by means of the arrangement of guide vanes at the downstream edge of the spacer in the fuel assembly is described in PCT patent document WO 91/13442. Two or four guide vanes are arranged extending from the mentioned edge and curved in such a way that a swirl is formed in the upwardly flowing coolant. Further, the guide vanes are exposed and may become damaged in connection with the mounting of the fuel rods.

Another method is described in Swedish patent document PCT patent document SE 9303583-0. The spacer described in this document comprises an orthogonal latticework formed from sleeves. In this spacer, guide vanes are formed as tabs in the sleeve material. The disadvantage of this solution is that the larger the tab chosen, the larger part of the supporting length of the fuel rod is lost.

Known spacers are often designed completely or partially of Inconel which is a material with a good strength and good properties as far as manufacture of spacers is concerned. However, it is desirable to manufacture spacers of a material with less ability to absorb neutrons, that is, a low-absorbing material, for example a zirconium alloy. Spacers of zirconium alloy are an advantage from the point of view of reactivity economy. In addition, spacers of a low-absorbing material are less radioactive after irradiation. This is an advantage when handling these spacers after reactor operation.

The object of the invention is to provide a spacer which gives good cooling, small flow resistance, and which is simple to manufacture and, in addition, is possible to construct of zirconium alloy.

SUMMARY OF THE INVENTION

The present invention relates to a fuel assembly and a spacer completely or partially made of zirconium alloy for a nuclear reactor. The spacer comprises an orthogonal latticework, composed of spacer cells. Each cell positions an elongated element, extending through the cell, at a plurality of spacer levels, for example a fuel rod or a control rod guide tube. Between the fuel assemblies, secondary channels are formed for the passage of coolant flow through the fuel assembly. In at least the majority of these secondary channels, at least in the majority of spacer levels, guide vane trees with a trunk and branches are arranged. The trunk consists, for example, of a rectangular plate with its longitudinal edge arranged parallel to the flow. Alternatively, the trunk includes a pipe or sheet-metal strip, shaped like a helical spring, arranged with its respective conceived center line parallel to the coolant flow. The branches project from the trunk at at least two axially separated levels along the trunk and conduct the coolant flow towards the fuel rods arranged around the guide vane tree.

The coolant flowing in the fuel assembly, that is, through the primary channel, from below and upwards, first reaches the trunk of the tree which preferably has a minimum extension across the direction of flow. The trunk conducts the coolant to the branches, or guide vanes, of the tree. By the axial distribution of the guide vanes along the length of the trunk, the coolant flow is diverted in several steps, whereby the control of the coolant flow towards the fuel rods is ensured.

The guide vane tree is intended to be arranged in a secondary channel and between the spacer cells which surround the secondary channel, or at the downstream edge of the spacer cells.

The size and length of the guide vane tree may be varied depending on where in the fuel assembly it is intended to be arranged. The shape of the guide vanes may vary for optimization of the control of the coolant flow. The guide vanes may, for example, be smooth or arched. The need to stir and direct the coolant towards the fuel rods is greatest downstream of the fuel assembly where the steam content, and hence the risk of so-called dryout, is greatest. Each guide vane contributes to the pressure drop across the fuel assembly. Upstream of the fuel assembly, guide vanes may be completely omitted in order to reduce the total pressure drop. In a particularly advantageous embodiment, the guide vane tree has the same extent in the flow direction as the spacer cells and are arranged therebetween so that the guide vane tree does not project from the spacer. The advantage of this design is that the cells in the spacer reflect the coolant towards the guide vane tree such that a greater part thereof may be diverted thereby.

Each spacer which is provided with a plurality of guide vane trees according to the present invention may, in addition, be provided with conventional structural parts such as a four-sided frame or skirt comprising the whole bundle.

The advantage of the present invention is that a spacer, which in the majority of the secondary channels is provided with guide vane trees, provides good cooling of the fuel rods arranged around the guide vane tree, whereby the output power from the fuel assembly may be increased. Further, the guide vane tree constitutes a small flow resistance which is important, not least from the point of view of two-phase pressure drop. The two-phase pressure drop is the pressure drop that usually arises in the upper part of the fuel assembly where the steam mixture contains the two phases water and steam.

Another advantage of the present invention is that the design of the guide vane tree permits a simple manufacturing process.

Still another advantage of the present invention is that the guide vane tree may be constructed of zirconium alloy. Using zirconium alloy instead of Inconel in the spacers entails, among other things, a reduction of the radiation to which reactor personnel are exposed, or the so-called personnel dose. The reason for the influence on the personnel dose is that, upon irradiation of nickel which is part of Inconel, radioactive cobalt isotopes are formed in the process water. Smaller amounts of nickel thus lead to a lower cobalt content, which causes the personnel dose to be reduced.

The design of the guide vane tree according to the present invention permits considerable options for guiding the flow in an optimum manner and achieving good cooling. Some of these embodiments will be described below under the description of the preferred embodiments.

BRIEF DESCRIPTION OF THE DRAWINGS

The invention will be most readily understood with reference to the accompanying drawings.

FIGS. 7a–c show, in a side view and a top view, an embodiment of a guide vane tree according to the present invention with four guide vanes, of which three are spaced apart in the axial direction with;

DESCRIPTION OF THE PREFERRED EMBODIMENTS

Figure 1:
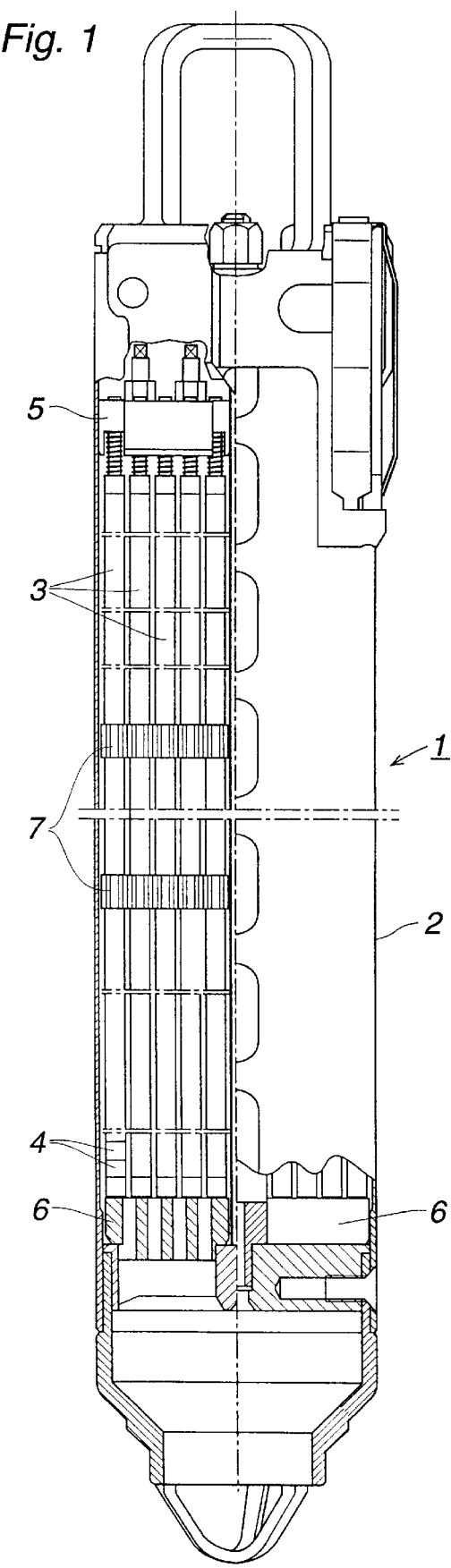
FIG. 1 shows a fuel assembly for a boiling water reactor.

FIG. 1 shows a boiling water reactor fuel assembly 1 which comprises an elongated tubular container having rectangular cross section, referred to as fuel channel 2. The fuel channel 2 is open at both ends so as to form a continuous flow passage that the coolant of the reactor flows through. The fuel assembly 1 comprises a large number of equally elongated tubular fuel rods 3, arranged in parallel in a bundle, in which pellets 4 of a nuclear fuel are arranged. The fuel rods 3 are retained at the top by a top tie plate 5 and at the bottom by a bottom tie plate 6. The fuel rods 3 are kept spaced from each other by means of spacers 7 and are prevented from bending or vibrating when the reactor is in operation.

Figure 2:
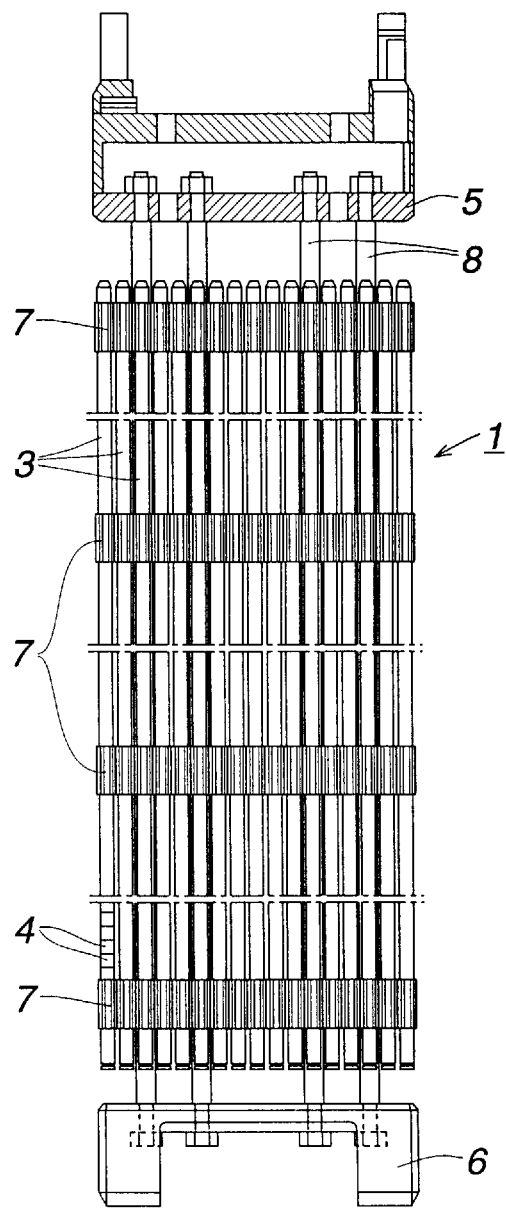
FIG. 2 shows a fuel assembly for a pressurized-water reactor.

FIG. 2 shows a pressurized-water reactor fuel assembly 1 which comprises a number of elongated tubular fuel rods 3 and control rod guide tubes 8 arranged in parallel. The fuel rods 3 contain pellets 4 of a nuclear fuel. The control rod guide tubes 8 are retained at the top by a top nozzle 5 and at the bottom by a bottom nozzle 6. The fuel rods 3 are kept spaced from each other by means of spacers 7.

Figure 3A:
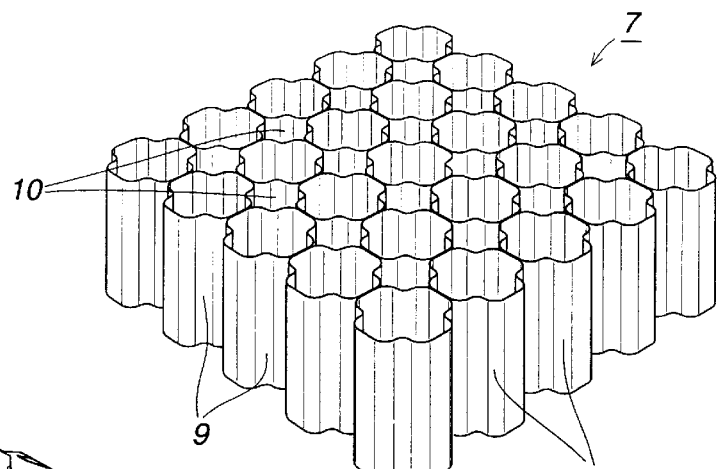
FIGS. 3a–d show different types of spacer structures.
Figure 3B:
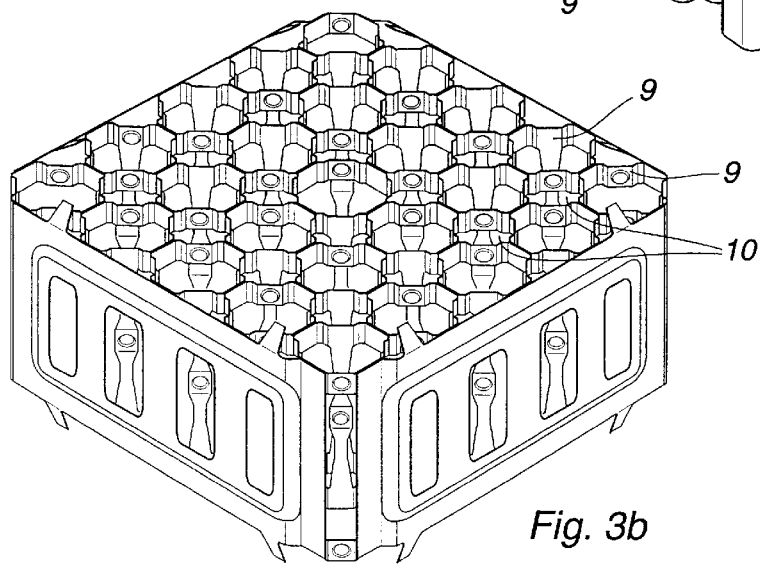
Figure 3D:
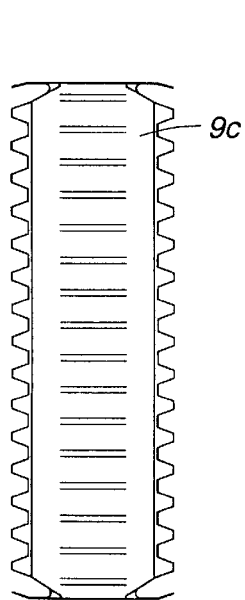
Figure 3C:
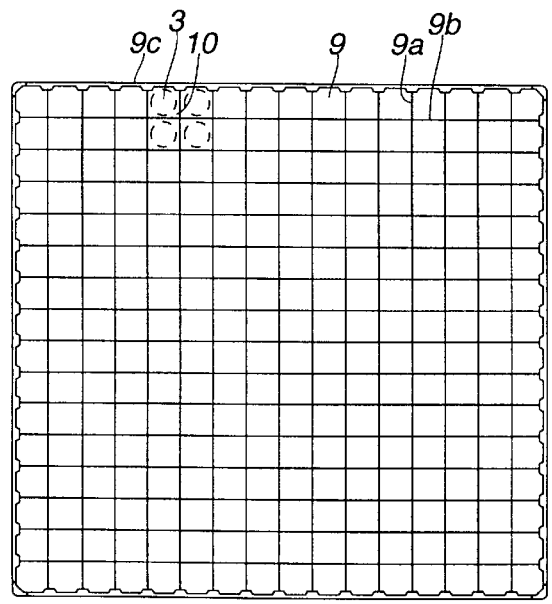

FIGS. 3a–b show, in perspective views, a spacer 7 with an orthogonal latticework. FIG. 3 shows a spacer 7 composed of sleeves 9. Each sleeve 9 is intended to position an elongated element extending therethrough, for example a fuel rod 3 or a control rod guide tube 8. FIG. 3b shows a spacer 7 composed of cells 9. Between the fuel rods 3 arranged in the cells 9 and the sleeves 9, respectively, channels 10, referred to as secondary channels, are arranged. FIGS. 3c–d show, in a top view and a side view, respectively, a latticework of sheet-metal strips 9a, 9b. The strips are arranged crosswise and standing on edge, and are surrounded by a frame 9c.

FIGS. 4–13 illustrate several alternative embodiments of guide vane trees according to the present invention. FIGS. 4–8 show an example with two, three or four branches arranged at a trunk in the form of a substantially rectangular plate arranged parallel to the substantial coolant flow. FIGS. 9–13 show alternative embodiments of the guide vane tree.

Figure 4A:
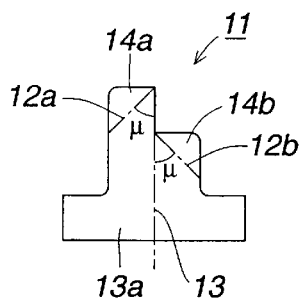
FIGS. 4a–c show, in a side view and a top view, an embodiment of a guide vane tree according to the present invention with two axially spaced-apart guide vanes.
Figure 4B:
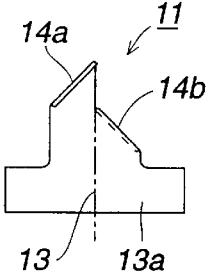
Figure 4C:
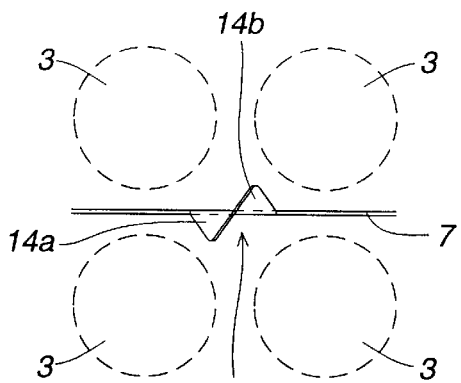

FIG. 4a shows a blank for a guide vane tree 11 with a first and a second folding line 12a, b. The guide vane tree also include a center line 13 where the angle of the folding lines 12a, b to the center line 13 is designated $\mu°$ and shown to be 45°. A first tab 14a to the left of and above the first folding line 12a is intended to be folded 90° around the first folding line 12a in a direction towards the viewer. A second tab 14b to the right of and above the second folding line 12b is intended to be folded 90° around the second folding line 12b and in a direction away from the viewer. When the first and second tabs 14a, b are folded down, an appearance of the guide vane tree 11 from the side as shown in FIG. 4b is obtained. FIG. 4c shows a top view of the guide vane tree 11 arranged between four fuel rods 3. The tree 11 is attached to a structure comprised by the spacer 7. The structure consists of sheet-metal strips, arranged crosswise and standing on edge, which form cells through which the fuel rods 3 run.

Figure 5A:
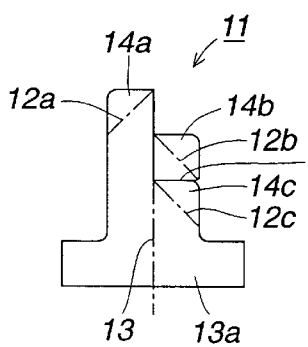
FIGS. 5a–c show, in a side view and a top view, an embodiment of a guide vane tree according to the present invention with three axially spaced-apart guide vanes.
Figure 5B:
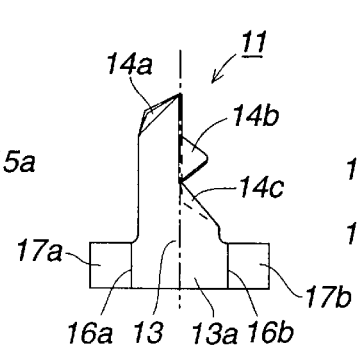
Figure 5C:
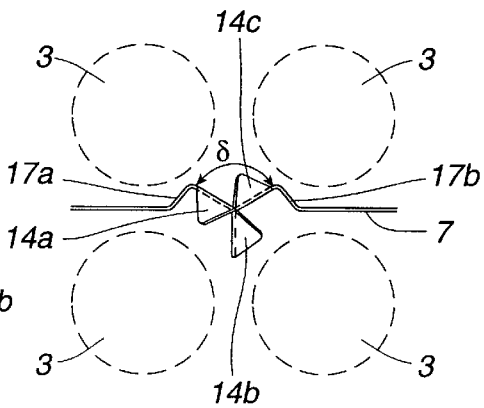

FIG. 5a shows a blank for a guide vane tree 11 with a first, a second and a third folding line 12a, b, c and a center line 13. The blank is provided with a slit 15a arranged between the second 12b and third 12c folding lines and the center line 13. A first tab 14a to the left of and above the first folding line 12a is intended to be folded 90° around the first folding line 12a, in a direction towards the viewer. A second tab 14b to the right of and above the second folding line 12b is intended to be folded 90° around the second folding line 12b, in a direction away from the viewer and 90° around the center line 13, in a direction towards the viewer. A third tab 14c arranged to the right of and above the third folding line 12c is intended to be folded 90° around the third folding line 12c and in a direction away from the viewer. When the first, second and third tabs 14a, b, c are folded to their final positions, an appearance of the guide vane tree 11 from the side as shown in FIG. 5b is obtained. FIG. 5b also shows a fourth and fifth folding line 16a, b on each side of the center line 13. On each outer side of the fourth 16a and fifth 16b folding lines, respectively, a first 17a and a second 17b attachment tab are folded around the fourth 16a and fifth 16b folding lines, respectively, in a direction towards the viewer. The angle for the folding is adapted to the available space. Further, the blank is folded around the center line 13 in a direction away from the viewer so as to form an angle $\partial°$ of 120° in FIG. 5c, between the fourth 16a and fifth 16b folding lines. FIG. 5c shows the guide vane tree 11 in a view from above arranged between four fuel rods 3. The tree 11 is attached to a structure comprised by the spacer 7. The structure consists of sheet-metal strips, arranged crosswise and standing on edge, forming cells through which the fuel rods 3 are running.

Figure 6A:
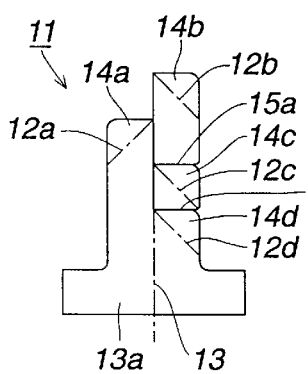
FIGS. 6a–d show, in a side view and a top view, an embodiment of a guide vane tree according to the present invention with four axially spaced-apart guide vanes.
Figure 6B:
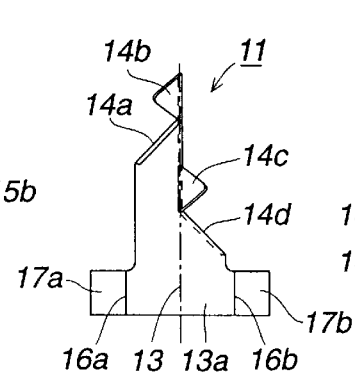
Figure 6C:
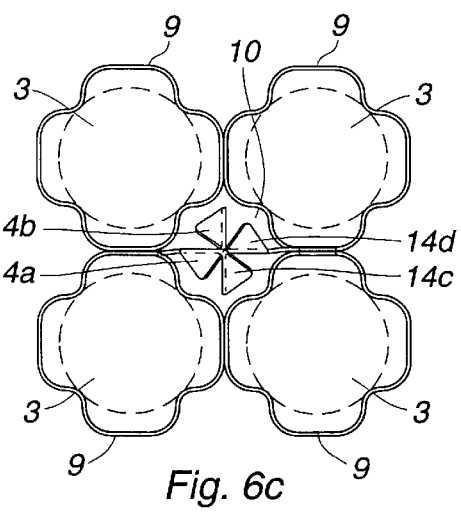
Figure 6D:
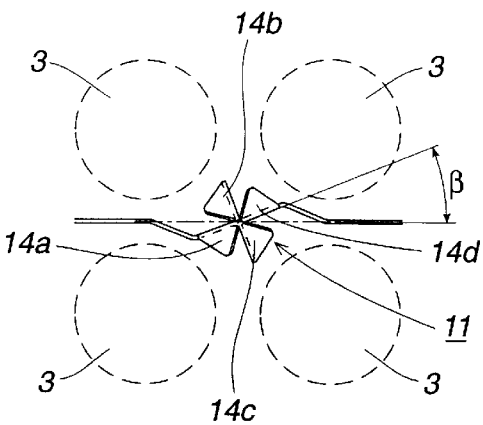

FIGS. 6a–c show a guide vane tree of a particularly advantageous design. FIG. 6a shows a blank for a guide vane tree 11 with a first, a second, a third, and a fourth folding line 12a–d and a center line 13. The blank includes with a first slit 15a arranged between the second 12b and third 12c folding lines and the center line 13. The blank also includes a second slit 15b arranged between the third 12c and fourth 12d folding lines and the center line 13. A first tab 14a to the left of and above the first folding line 12a is intended to be folded 90° around the first folding line 12a, in a direction towards the viewer. A second tab 14b to the right of and above the second folding line 12b is intended to be folded 90° around the second folding line 12b, in a direction away from the viewer and 90° around the center line 13, in a direction away from the viewer. A third tab 14c is arranged to the right of and above the third folding line 12c and is intended to be folded 90° around the third folding line 12c and in a direction away from the viewer and 90° around the center line 13, in a direction towards the viewer. A fourth tab 14d arranged to the right of and above the fourth folding line 12d is intended to be folded 90° around the fourth folding line 12d, in a direction away from the viewer. When the first, second, third, and fourth tabs 14a–d are folded to their final positions, an appearance of the guide vane tree 11 from the side as shown in FIG. 6b is obtained. FIG. 6c shows the guide vane tree 11 in a view from above arranged between four fuel rods 3 in a structure of sleeve spacers 9 of the type shown in FIG. 3a. FIG. 6b also shows a fifth 16a and a sixth 16b folding line on each side of the center line 13. FIG. 6d shows that, on the outer side of the fifth folding line 16a, a first attachment tab 17a is folded around the fifth folding line 16a in a direction away from the viewer. On the outer side of the sixth folding line 16b, a second attachment tab 17b is folded around the sixth folding line 16b in a direction towards the viewer. FIG. 6d shows the guide vane tree 11 in a view from above arranged between four fuel rods 3. The guide vane tree 11 is attached in a structure comprised by the spacer 7. The structure consists of sheet-metal strips, arranged crosswise and standing on edge, forming cells through which the fuel rods 3 run.

The somewhat twisted attachment of the guide vane tree 11 at an angle $\beta°$, in FIG. 6d shown to be 20°, gives an optimum cooling of the surrounding fuel rods 3. The location of the guide vane tree 11, rotated through an angle of $\beta°$, may also be used for spacers 7 of the type indicated in FIG. 3a.

Figure 7A:
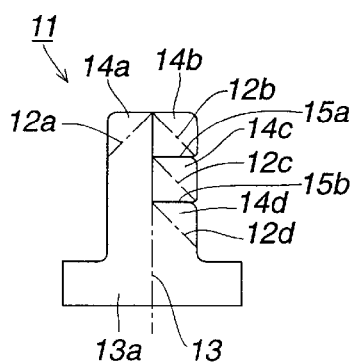
Figure 7B:
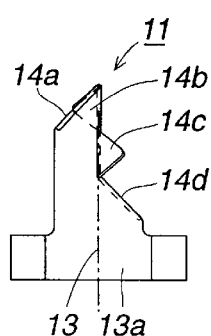
Figure 7C:
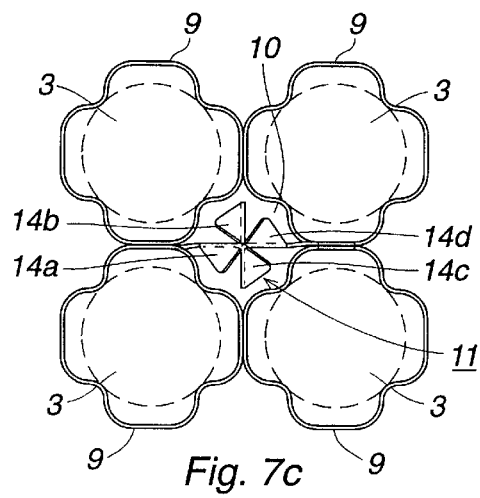

FIGS. 7a–e show a guide vane tree 11 with four guide vanes 14a–d, as shown in FIG. 6, but where two of the guide vanes 14a, b are placed at the same level. FIG. 7a shows a blank for a guide vane tree 11 with a first, a second, a third, and a fourth folding line 12a–d as well as a center line 13. The blank includes with a first slit 15a arranged between the second 12b and third 12c folding lines and the center line 13. The blank also includes a second slit 15b arranged between the third 12c and fourth 12d folding lines and the center line 13. The first tab 14a to the left of and above the first folding line 12a is intended to be folded 90° around the first folding line 12a, in a direction towards the viewer. The second tab 14b to the right of and above the second folding line 12b is intended to be folded 90° around the second folding line 12b, in a direction away from the viewer and 90° around the center line 13, in a direction away from the viewer. The third tab 14c is arranged to the right of and above the third folding line 12c and intended to be folded 90° around the third folding line 12c and in a direction away from the viewer and 90° around the center line 13, in a direction towards the viewer. The fourth tab 14d arranged to the right of and above the fourth folding line 12d is intended to be folded 90° around the fourth folding line 12d, in a direction away from the viewer. When the first, second, third, and fourth tabs 14a–d are folded to their final positions, an appearance of the guide vane tree 11 from the side as shown in FIG. 7b is obtained. FIG. 7c shows the guide vane tree 11 in a view from above arranged between four fuel rods 3 in a structure of sleeves 9, also shown in FIG. 3a.

Figure 8D:
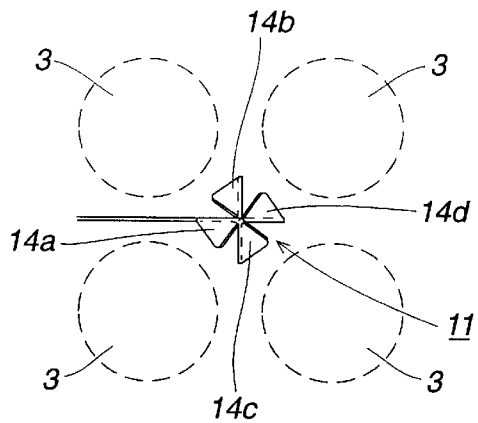
FIGS. 8a–d show, in principle, in a side view and a top view, different ways of attaching a guide vane tree to a spacer structure according to the present invention.
Figure 8A:
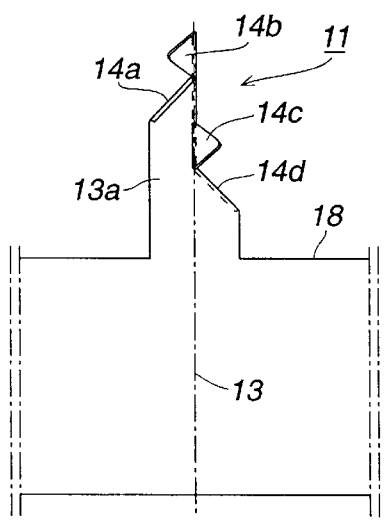
Figure 8B:
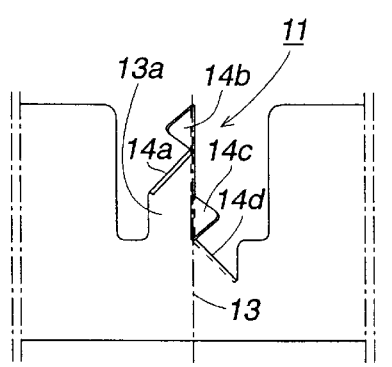
Figure 8C:
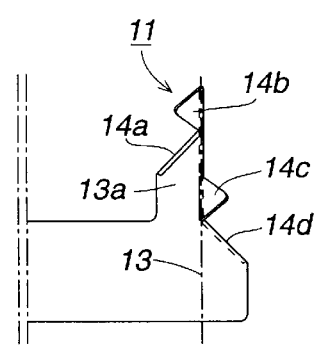

FIGS. 8a–d show a side view of the attachment of a guide vane tree 11 of the same type as that shown in FIG. 6b. FIG. 8a shows an attachment where the guide vane tree 11 is intended to project outside the upper edge of the spacer 7, this upper edge being arranged at the reference numeral 18. FIG. 8b shows an attachment where the guide vane tree 11 is intended to be arranged fully immersed into the spacer 7. This is a particularly advantageous embodiment when the guide vane tree is fully integrated into the structure. The immersed location gives the tree good protection against external influence during, for example, mounting of fuel rods. FIG. 8c shows a side view of how the guide vane tree 11 may be attached on one side to the spacer 7. This one-sided attachment is also clear from FIG. 8d, showing a view from above. The guide vane tree 11 may, of course, also be attached on three or four sides, although this is not explicitly shown in any figure.

Figure 9A:
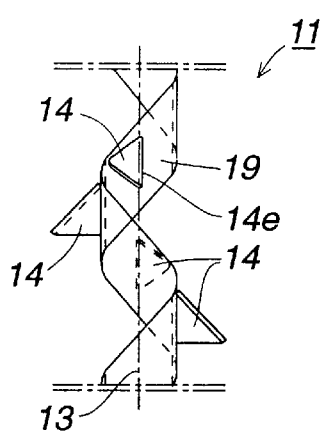
FIGS. 9a–b show a side view and a top view, respectively, of an embodiment of a guide vane tree according to the present invention with four axially spaced-apart guide vanes externally arranged on the surface of a helical spring-shaped trunk.
Figure 9B:
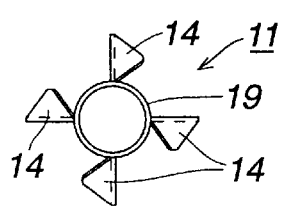

FIG. 9a shows a side view of a guide vane tree 11, the trunk of which consists of a sheet-metal strip twisted into a helical spring 19. Four guide vanes 14 are attached to the outwardly facing surfaces of the helical spring 19, at different levels and with an angular pitch of 90°. The guide vanes 14 consist of square plates folded 90° around their respective diagonals and attached to the helical spring 19 by one plate edge 14e. FIG. 9b shows a top view of the guide vane tree 11 shown in FIG. 9a.

Figure 10A:
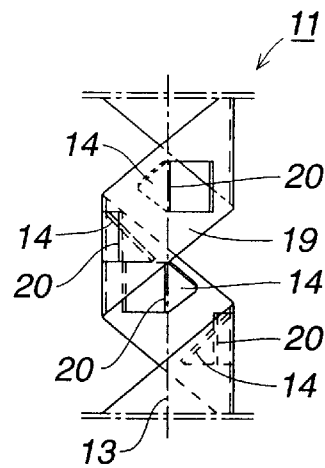
FIGS. 10a–b show a side view and a top view, respectively, of an embodiment of a guide vane tree according to the present invention with four axially spaced-apart guide vanes internally arranged on the surface of a helical spring-shaped trunk.
Figure 10B:
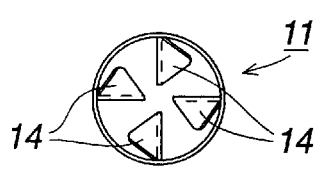

FIG. 10a shows in a view from the side a guide vane tree 11, the trunk of which consists of a sheet-metal strip twisted into a helical spring 19, as in the embodiment shown in FIG. 9. In the surfaces of the helical spring 19, along three out of four sides, four square tabs are punched out at different levels and with a 90° angular pitch. The non-punched side 20 is parallel to a conceived center line 13 through the helical spring 19. The square tabs are then folded 90° around a line through the non-punched side 20 and 90° around a diagonal through the square tab. FIG. 10b shows a top view of the guide vane tree 11 shown in FIG. 10a.

Figure 11A:
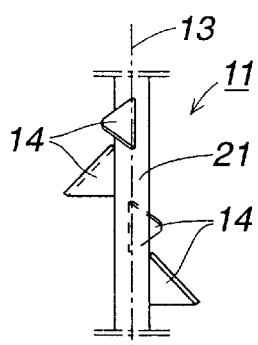
FIGS. 11a–b show a side view and a top view, respectively, of an embodiment of a guide vane tree according to the present invention with four axially spaced-apart guide vanes arranged on the surface of a pin-shaped trunk.
Figure 11B:
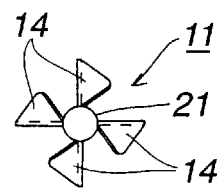

FIG. 11a shows a guide vane tree 11, the trunk of which consists of a solid pin 21 to which are attached guide vanes 14 in the same way as in FIG. 9. FIG. 11b shows a top view of the guide vane tree 11 shown in FIG. 11a.

Figure 12A:
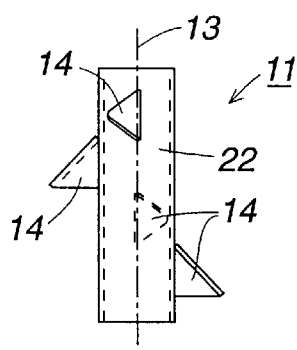
FIGS. 12a–b show a side view and a top view, respectively, of an embodiment of a guide vane tree according to the present invention with four axially spaced-apart guide vanes externally arranged on the surface of a tubular trunk.
Figure 12B:
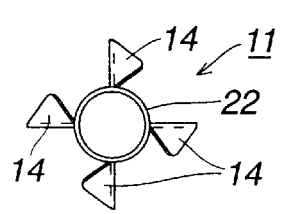

FIG. 12a shows a guide vane tree 11, the trunk of which consists of a tube 22 to which are attached guide vanes 14 in the same way as in FIGS. 9 and 11. FIG. 12b shows a top view of the guide vane tree 11 shown in FIG. 12a.

Figure 13A:
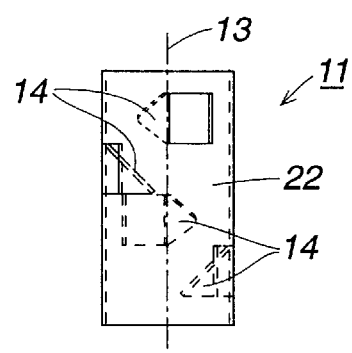
FIGS. 13a–b show a side view and a top view, respectively, of an embodiment of a guide vane tree according to the present invention with four axially spaced-apart guide vanes internally arranged on the surface of a tubular trunk.
Figure 13B:
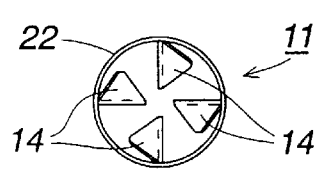

FIG. 13a shows a guide vane tree 11, the trunk of which consists of a tube 22 to which are attached guide vanes 14 in the same way as in FIG. 10. FIG. 13b shows a top view of the guide vane tree 11 shown in FIG. 13a.

Figure 14A:
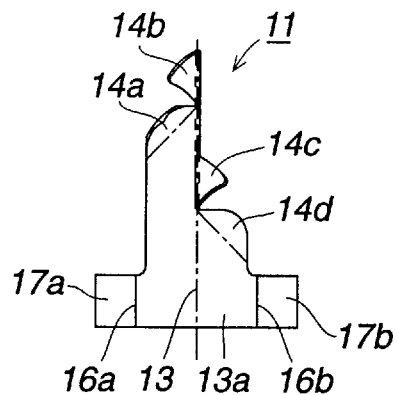
FIGS. 14a–b show side view and a top view, respectively, of an embodiment of a guide vane tree according to FIGS. 6a–d, wherein the guide vanes exhibit an arched surface.
Figure 14B:
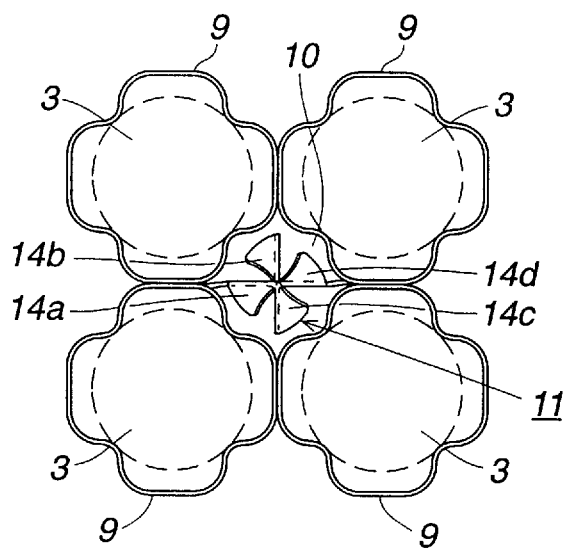

FIGS. 14a, b show a guide vane tree 11 corresponding to that shown in FIG. 6 but where the guide vanes 14a–d exhibit an arched shape. FIG. 14a shows a side view of the guide vane tree 11 with arched guide vanes 14a–d. FIG. 14b shows a top view of the guide vane tree 11 arranged between four fuel rods 3, each surrounded by a spacer cell 9.

Figure 15:
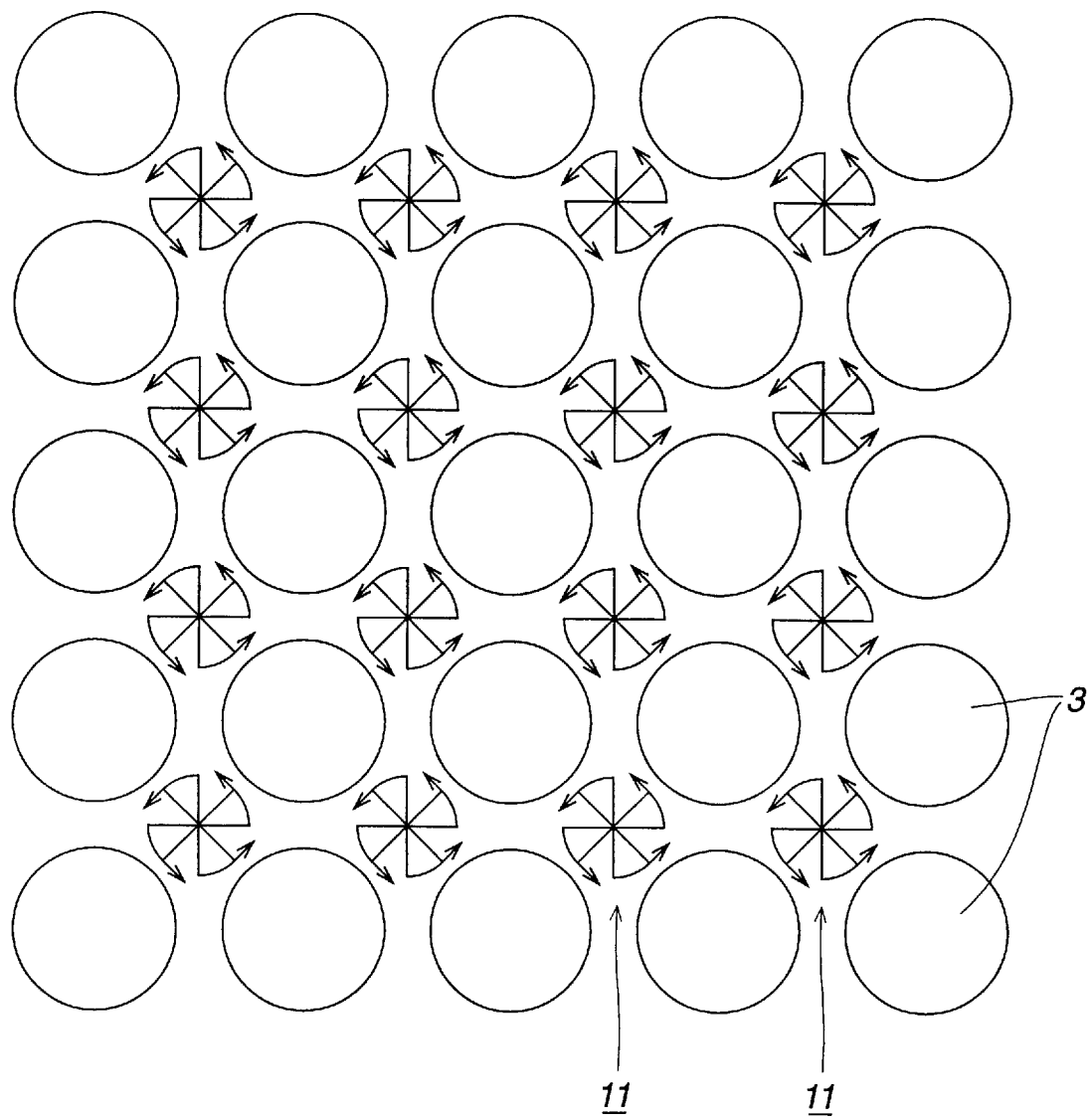
FIG. 15 shows a sketch showing how the guide vane trees direct the coolant flow towards the surrounding fuel rods in a portion of a fuel assembly according to FIG. 1 or 2, wherein all of the guide vane trees are adapted to direct the flow in the counterclockwise direction.

FIG. 15 is a sketch showing the principle of how the guide vane trees 11 direct the coolant flow towards the fuel rods 3, arranged around them, in part of a fuel assembly according to FIG. 1 or 2. All the guide vane trees 11 are adapted to direct the flow in a counterclockwise direction.

Figure 16:
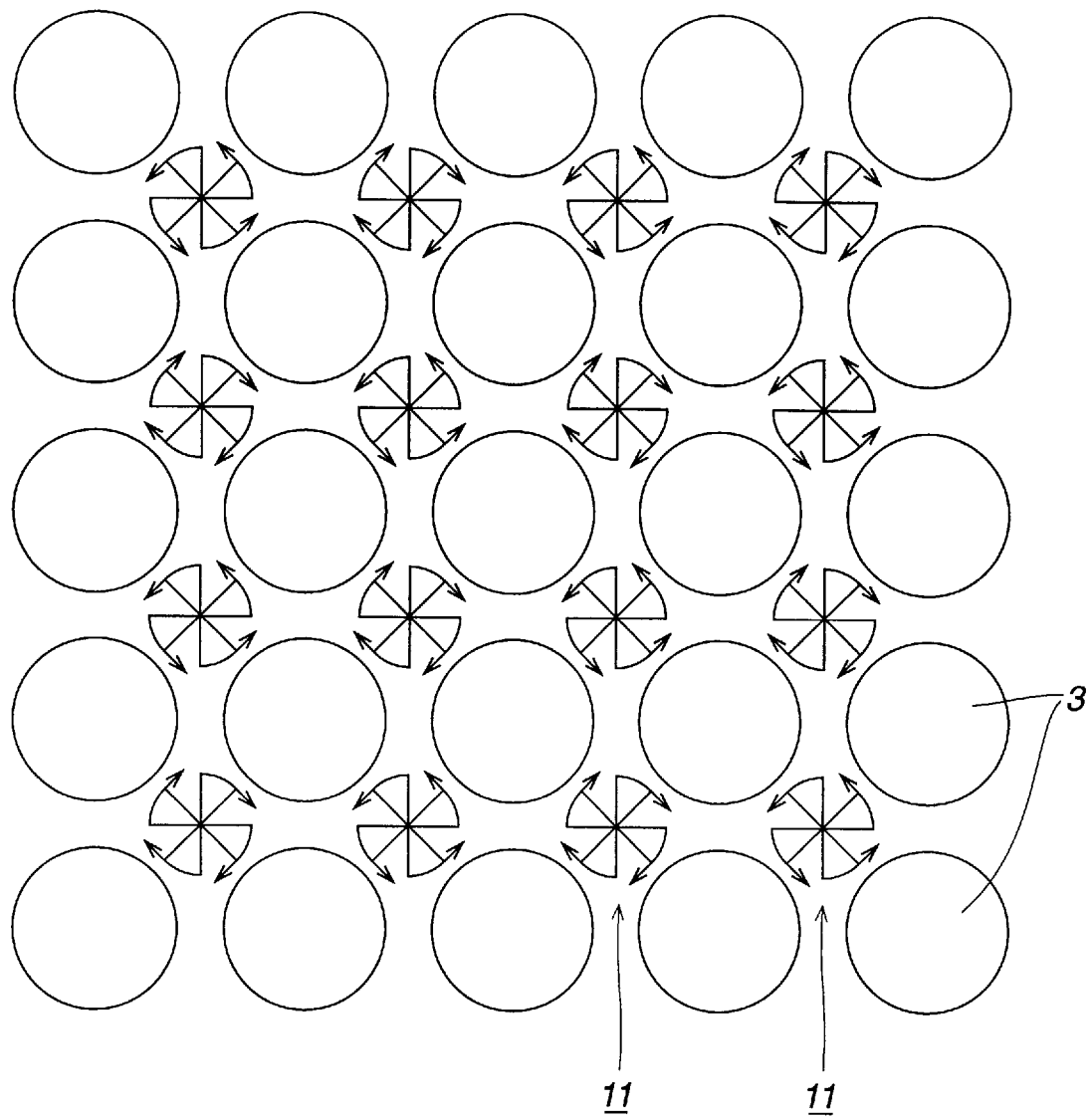
FIG. 16 shows the same sketch as FIG. 15, with guide vane trees adapted to alternately direct the flow in a counter-clockwise and a clockwise direction, respectively.

FIG. 16 is a sketch showing the principle of how the guide vane trees 11 direct the coolant flow towards the fuel rods 3, arranged around them, in part of a fuel assembly. The guide vane trees 11 are alternately adapted to direct the flow in a counterclockwise and a clockwise direction, respectively.

Common to the exemplified guide vane trees is that the coolant, flowing up from and below, is diverted in several stages. When the coolant reaches the lowermost tab, the coolant changes direction and is deflected away from the tree. The tab arranged immediately above is reached by coolant which has already, at least partially, been diverted with the aid of the change of the direction of the coolant caused by the tabs located below. By connecting in series tabs which are arranged axially displaced, the coolant is deflected upon passage of the guide vane tree. By this series connection of axially displaced tabs, an increased cooling capacity and a reduced pressure drop are obtained in comparison with tabs positioned in a single plane.

In cases where the guide vane tree is arranged immersed in the spacer structure and the spacer structure consists of a sleeve structure corresponding to that shown in FIG. 3a, part of the upwardly flowing coolant is guided by the sleeve walls and towards the guide vanes. By arranging the guide vane tree inside the spacer, the effect of the spacer is increased.

The shape of the guide vane tree may be varied in many ways with respect to the size, shape, number, deflection in relation to the trunk, and location of the vanes along the trunk.

In all the figures, the deflection members 14 are folded 90° around the folding lines 12. For optimum function, however, an arbitrary magnitude of this angle may be chosen. The same applies to the angle $\mu$ of the folding lines 12 to the center line 13. In all figures the $\mu$ is shown as 45° but may be chosen arbitrarily to achieve an optimum function. In the embodiments according to FIGS. 9–13, it may be of interest in certain cases to arrange more than four axially spaced-apart deflection members 14 along the guide vane (19, 21. 22).

It is possible to construct the guide vane trees of Inconel or of a zirconium alloy.

We claim:

1. A spacer, comprising:
   a plurality of cells to retain and mutually fix parallel, elongated elements, extending through the cells, in a bundle in a fuel assembly for a nuclear reactor where a coolant is adapted to flow from below and upwards and where, between the cells, secondary channels are formed, at least two deflection members being substantially arranged in at least one of said secondary channels so as to be surrounded by the cells, characterized in that the deflection members are axially spaced-apart in the direction of flow of the coolant and relative to each other at a pitch angle for stepwise axial and radial deflection and guiding of at least part of the coolant flow towards fuel rods included in the bundle, the fuel rods being arranged close to the secondary channels.

2. A spacer according to claim 1, wherein the deflection members are arranged on a guide vane for guiding the coolant flow to the deflection members.

3. A spacer according to claim 2, wherein the guide vane includes a substantially rectangular plate and wherein the deflection members include tabs arranged at a longitudinal edge of the guide vane.

4. A spacer according to claim 2, wherein the guide vane includes a spirally-shaped member and wherein the deflection members are arranged at an inner or an outer surface of the spirally-shaped member.

5. A spacer according to claim 2, wherein the guide vane includes a tube and wherein the deflection members are arranged at an inner or an outer surface of the tube.

6. A spacer according to claim 2, wherein the guide vane includes a pin and wherein the deflection members are arranged at an envelope surface of the pin.

7. A spacer according to claim 1, wherein the deflection members are adapted to direct the coolant in at least two directions in a plane different from a main flow direction of the coolant.

8. A spacer according to claim 1, wherein an axial length of the deflection members in the direction of flow of the coolant is smaller than or equal to an axial length of the spacer in the direction of flow of the coolant, and wherein the deflection members are completely surrounded by the cells.

9. A spacer according to claim 1, including four deflection members.

10. A spacer according to claim 2, wherein the deflection members and the guide vane are made of a zirconium alloy.

11. A spacer according to claim 1, wherein the deflection members are arched.

12. A fuel assembly for a nuclear reactor with a bundle of elongated elements retained by a plurality of spacers, arranged at different spacer levels along the bundle, each one of these spacers including a plurality of spacer cells between which are formed secondary flow channels, characterized in that it comprises spacers according to claim 1.

13. A spacer for a fuel assembly of a nuclear reactor, said spacer comprising:

a plurality of cells for receiving and retaining a plurality of parallel elongated elements, said elongated elements including fuel rods of the nuclear reactor;

a plurality of secondary channels between selected ones of said cells, said secondary channels permitting a coolant to flow therethrough;

at least two deflection members provided in at least one of said secondary channels, said deflection members being arranged so as to be substantially surrounded by said cells, said deflection members being axially spaced-apart in a direction of flow of the coolant and spaced apart relative to each other at a pitch angle for stepwise axial and radial deflection and guiding of at least a portion of the coolant flowing through said secondary cells toward the fuel rods.

14. A fuel assembly for a nuclear reactor, said fuel assembly comprising:

a plurality of elongated fuel rods;

a plurality of elongated control rods;

a plurality of spacers arranged at a plurality of levels along said fuel rods and said control rods, each spacer including a plurality of spacer cells for receiving and retaining said fuel rods and said control rods, each spacer also including a plurality of secondary channels between selected ones of said cells, said secondary channels permitting a coolant to flow therethrough; and at least two deflection members provided in at least one of said secondary channels, said deflection members being arranged so as to be substantially surrounded by said cells, said deflection members being axially spaced-apart in a direction of flow of the coolant and spaced apart relative to each other at a pitch angle for stepwise axial and radial deflection and guiding of at least a portion of the coolant flowing through said secondary channels toward the fuel rods.

15. A spacer, comprising:

a plurality of cells for retaining and mutually fixing parallel elongated elements extending through the cells in a bundle in a fuel assembly for a nuclear reactor, the elongated elements including fuel rods, wherein a coolant is adapted to flow from below and upwards through the spacer;

secondary channels between the cells, such that the fuel rods are arranged in the cells in the vicinity of the secondary channels; and at least two deflection members extending downstream of an edge of the spacer and arranged in a path of the secondary channels, the deflection members being axially spaced apart in a direction of flow of the coolant and relative to each other at a pitch angle relative to each other for stepwise axially and radially deflecting and guiding of at least part of the coolant flow towards the fuel rods.

16. A spacer according to claim 15, wherein the edge of the spacer that the at least two deflection members extend from is recessed with respect to an upper edge of the spacer and the at least two deflection members are substantially surrounded by the cells.

* * * * *